(12) United States Patent
Sebire et al.

(10) Patent No.: US 7,599,664 B2
(45) Date of Patent: Oct. 6, 2009

(54) MOBILE EQUIPMENT BASED FILTERING FOR PACKET RADIO SERVICE (PRS)

(75) Inventors: Guillaume Sebire, Helsinki (FI); Yuping Zhao, Espoo (FI); Eero Nikula, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 12/079,317

(22) Filed: Mar. 26, 2008

(65) Prior Publication Data

US 2008/0207134 A1    Aug. 28, 2008

Related U.S. Application Data

(63) Continuation of application No. 11/707,525, filed on Feb. 16, 2007, now Pat. No. 7,383,022, which is a continuation of application No. 09/457,952, filed on Dec. 9, 1999, now abandoned.

(51) Int. Cl.
*H04B 17/00* (2006.01)

(52) U.S. Cl. ............... 455/67.11; 455/441; 455/456; 455/515; 455/65

(58) Field of Classification Search ............... 455/67.11, 455/515, 441, 456, 65
See application file for complete search history.

(56) References Cited

U.S. PATENT DOCUMENTS

| | | | |
|---|---|---|---|
| 5,502,713 A | 3/1996 | Lagerqvist et al. | 370/252 |
| 5,909,384 A | 6/1999 | Tal et al. | 364/724.19 |
| 5,995,496 A | 11/1999 | Honkasalo et al. | 370/318 |
| 6,256,486 B1 | 7/2001 | Barany et al. | 455/296 |
| 6,256,500 B1 | 7/2001 | Yamashita | 455/441 |
| 6,259,927 B1 * | 7/2001 | Butovitsch et al. | 455/522 |
| 6,285,884 B1 | 9/2001 | Vaara | 455/441 |
| 6,308,066 B1 | 10/2001 | Ranta et al. | 455/432 |
| 6,351,642 B1 | 2/2002 | Corbett et al. | 455/442 |
| 6,370,357 B1 | 4/2002 | Xiao et al. | 455/67.1 |
| 6,385,260 B1 | 5/2002 | Tongbing | 455/515 |

(Continued)

FOREIGN PATENT DOCUMENTS

| | | |
|---|---|---|
| EP | 0 899-906 A2 | 8/1998 |
| WO | WO-99/62213 | 2/1999 |
| WO | WO-99/59273 A1 | 11/1999 |

OTHER PUBLICATIONS

"EGPRS Link Quality Control Mesaurements and Filtering", ETSI SMG2 WPA/B/C/P, Tdoc SMG2 1048/99, Sep. 20-24, 1999, Bordeaux, France (Source: Ericsson).

Digital Cellular Telecommunications System (Phase 2+) Mobile Radio Interface Layer 3 Specification (GSM 04.08 version 8.0.0 Release 1999) GSM 04.08.8.0.0 (Jul. 1999).

(Continued)

*Primary Examiner*—David Q Nguyen
(74) *Attorney, Agent, or Firm*—Harrington & Smith, PC

(57) ABSTRACT

A method for operating a mobile equipment (ME 10) in a wireless network (12) includes receiving from a wireless network a parameter that is indicative of a signal quality experienced by the ME, such as by determining a speed of the ME; calculating in the ME an indication of link quality, the calculation employing a filtering operation having a filter length that is a function of the determined parameter, such as speed or derivative of the speed of the ME; and reporting the calculated indication of link quality to the wireless network. The wireless network derives an indication of ME speed and transmits the speed indication to the ME using a point-to-point message.

28 Claims, 3 Drawing Sheets

U.S. PATENT DOCUMENTS

| | | | |
|---|---|---|---|
| 6,385,460 B1 * | 5/2002 | Wan | 455/515 |
| 6,389,295 B1 | 5/2002 | Ramesh | 455/517 |
| 6,434,367 B1 | 8/2002 | Kumar et al. | 455/70 |
| 6,438,375 B1 | 8/2002 | Muller | 455/435 |
| 6,522,888 B1 | 2/2003 | Garceran et al. | 455/456 |
| 6,658,045 B1 | 12/2003 | Jin | 375/147 |

OTHER PUBLICATIONS

Digital Cellular Telecommunications System (Phase 2+) General Packet Radio Service (GPRS); Mobile Station (MS)-Base Station Systems (BSS) Interface; Radio Link Control/Medium Access Control (RLC/MAC Protocol (GSM 04.60 version 8.0.0 Release 1999), M 04.60.V8.0.0 (Jul. 1999).

* cited by examiner

MOBILE EQUIPMENT BASED FILTERING FOR PACKET RADIO SERVICE (PRS)

PRIORITY STATEMENT

This application is a continuation application under 35 U.S.C. § 120 of U.S. patent application Ser. No. 11/707,525, filed on Feb. 16, 2007 now U. S. Pat. No. 7,383,022; which is itself a continuation of U.S. patent application Ser. No. 09/457,952, filed on Dec. 9, 1999 now abandoned. This application hereby claims benefit to each of those applications and priority to Dec. 9. 1999.

FIELD OF THE INVENTION

This invention relates generally to mobile equipment, such as radio telephones, cellular telephones and personal communicators, also known generally as wireless terminals and as mobile stations, and, more particularly, to methods and apparatus for providing packet data services for mobile equipment.

BACKGROUND OF THE INVENTION

Modern wireless telecommunications systems are evolving to provide high speed packet data services for users of mobile equipment. One example is an ability to provide internet access to a user of mobile equipment. A wireless system that is rapidly evolving in this direction is a Time Division, Multiple Access (TDMA) system known as the Global System for Mobile Communication (GSM), in particular enhanced versions of GSM known as GSM+ and EGPRS (Enhanced General Packet Radio Services).

As can be appreciated, an important consideration when it is desired to provide high speed data communications in a wireless system is the various radio path signal impairments that can occur, such as fading and noise. If not properly accounted for, the presence of these impairments can result in the occurrence of unacceptable or objectionable transmission/reception error rates.

More particularly, for EGPRS it has been recently proposed that link quality measurements, namely a mean Bit Error Probability (BEP) and a coefficient of variation (cv) (BEP), should be individually filtered for a sequence of measurement data in the ME before being reported on the uplink to the wireless network (ETSI SMG2 Tdoc 1048/99: "EGPRS Link Quality Control Measurements and Filtering", Ericsson, 20-24 Sep. 1999, Bordeaux, France.) In this document it was proposed to use a running average exponential filter that is characterized by its "forgetting factor" (or averaging period) being broadcast to all of the ME in the serving cell, the same as in the General Packet Radio Service (GPRS). The forgetting factor was proposed to be broadcast using a pre-existing Packet Broadcast Control Channel (PBCCH), if available, otherwise a Broadcast Control Channel (BCCH) would be used. In essence, this approach would provide a cell-based forgetting factor.

Subsequently, it was proposed in a document ETSI SMG2 Working Session on EDGE #11 Tdoc 2E99-501: "EGPRS LQC Measurements filtering", Nokia, 18-22 Oct. 1999, Austin Tex., USA, to replace the above-referenced forgetting factor by one that follows the definition for GPRS. It was pointed out that the filter proposed in the ETSI SMG2 Tdoc 1048/99 was not stable when the number of filtered data is below the so-called filter length. In order to counteract the filter instability the GPRS-based forgetting factor was proposed to be used.

This approach may be referred to as a non-fixed cell-based approach, in that it is similar to that found in GSM 05.08 v. 6.3.0, section 10.2.3.2 (Derivation of Channel Quality Report). In this approach, when the number of measurement data in the ME is less than the filter length, the forgetting factor is progressively adjusted so as to minimize the filter non-stability. It was also proposed to broadcast a parameter on the PBCCH, if available, otherwise on the BCCH, which is used by the ME in the serving cell to calculate the filter parameter, in combination with the amount of measurement data held by the ME. However, all ME having a sufficient amount of measurement data (exceeding the length of the filter) will use the same filter parameter.

FIGS. 1 and 2 are taken from the ETSI SMG2 Working Session on EDGE #11 Tdoc 2E99-501 document, and are graphs depicting weighting coefficients using various proposed forgetting factors. For a large forgetting factor (e.g., a=0.9) the measurement report made by the ME is dominated by the latest few measurement data, whereas when using a small forgetting factor the filtered results relate instead to a large number of past measurement data. By example, for the case of a=0.3, the filtered results correspond to over 100 past measurement blocks (about two seconds of measurement data.)

It was noted in the ETSI SMG2 Working Session on EDGE #11 Tdoc 2E99-501 document that within one cell various MEs might experience different channel conditions/fading effects (slow fading, fast fading, etc.) As a result, the viability of a filter with a cell-based forgetting factor (fixed or non-fixed) was questioned. Although not specifically addressed in this document, it was further noted that it would be of interest to study further whether a solution using a fixed cell-based forgetting factor (or GPRS-like) could, optionally, be replaced by a more optimal one.

In summary, currently deployed or proposed systems use a fixed/non-fixed cell-based filter for each mobile equipment (ME) in the serving cell. However, these solutions are less than optimal for all of the MEs that may be present within the cell. That is, they are at most a compromise, as it is well known that different MEs within the same cell will encounter different channel conditions and fading effects, at least some of which can be directly linked to the velocity of the MEs. As it is most improbable that all MEs within a given serving cell will be moving with the same velocity, any cell-based filter that makes such an assumption is bound to provide less than optimal results.

OBJECTS AND ADVANTAGES OF THE INVENTION

It is a first object and advantage of this invention to provide an improved filtering procedure that overcomes the foregoing and other problems.

It is a further object and advantage of this invention to provide a mobile equipment-based filtering technique, as opposed to a fixed or non-fixed cell-based filtering technique.

It is another object and advantage of this invention to provide a mobile equipment-based filtering technique for use in a packet data radio system that takes into consideration an indication of how interference experienced by the mobile equipment is changing, such as the speed of the mobile equipment, thereby providing a more optimal filtering of measurement data before the filtered measurement data is reported to the wireless network.

SUMMARY OF THE INVENTION

The foregoing and other problems are overcome and the objects of the invention are realized by methods and apparatus in accordance with embodiments of this invention.

A method is disclosed for operating a mobile equipment (ME) in a wireless network, the method having steps of (A) determining a parameter that is indicative of a signal quality experienced by the ME, such as by determining a speed of the ME; (B) calculating in the ME an indication of link quality, the calculation employing a filtering operation having a filter length that is a function of the determined parameter, such as speed or derivative of the speed of the ME; and (C) reporting the calculated indication of link quality to the wireless network. The filter length determines how many data are filtered. The step of determining includes steps of (a) deriving an indication of ME speed in the wireless network; and (b) transmitting the speed indication to the ME using a point-to-point message. In a preferred embodiment the step of transmitting places the ME speed indication in padding bits of the point-to-point message, such as one sent on a Packet Associated Control Channel (PACCH). In a most preferred embodiment the step of transmitting uses a plurality of bits placed into padding bits of a Packet System Identification 13 (PSI13) message sent on the Packet Associated Control Channel (PACCH). The plurality of bits (e.g., four bits) are used to encode a plurality of speed subranges (e.g., 16 subranges) of a predetermined ME speed range (e.g., 0 km/hr to 250 km/hr).

In a presently preferred embodiment of this invention, the indication of ME speed is used to one of modify a forgetting factor "a" that is calculated in the ME from parameter information received in a broadcast message from the wireless network, or to replace the received forgetting factor. The forgetting factor, in the preferred embodiment, directly influences the length of a filter (e.g., a running average filter) that operates on link quality measurement data. In an exemplary embodiment the running average filter operates on a sequence of measurements link quality, such as a mean Bit Error Probability or a coefficient of variation of the Bit Error Probability (cv) (BEP). In other embodiments of this invention the filter length could be adjusted directly, or it could be changed by using some parameter other than the forgetting factor "a".

BRIEF DESCRIPTION OF THE DRAWINGS

The above set forth and other features of the invention are made more apparent in the ensuing Detailed Description of the Invention when read in conjunction with the attached Drawings, wherein.

DETAILED DESCRIPTION OF THE INVENTION

This invention grows out of an appreciation by the inventors that in a typical urban environment a ME moving at a speed of 3 km/hr will most probably experience a different fading effect than a ME moving at a speed of 50 km/hr, while static (non-moving) MEs will experience some stable channel conditions that are not experienced by moving the MEs. Based on this knowledge, the inventors have provided a more optimal solution to the measurement data filtering problem by incorporating the speed of the ME into the filter calculations. More specifically, for a particular ME moving with a first, lower speed the measurement data is preferably filtered over a longer period of time (i.e., the forgetting factor is made smaller) than for a ME moving at a second, higher speed, where the channel conditions are less stable, and where the measurement data is preferably filtered over a shorter interval of time (i.e., the forgetting factor is made larger). In order to enhance the ME-based filtering process, the inventors have thus provided a technique wherein the speed of the ME is taken into account when defining the filter parameter (the forgetting factor in this case). In general, the result is to change the length of the filter, and the forgetting factor "a" is, in this case, the means by which the filter length is changed. In other embodiments, the filter length could be adjusted directly, or it could be changed by using some parameter other than the forgetting factor "a".

This improved filtering technique thus overcomes the problems that result when one filtering factor is used for all of the MEs within the serving cell, without regard for any speed differences between the different MEs, and, hence, without regard for any differing channel conditions experienced by the MEs.

It should be noted at the outset, however, that the teachings of this invention are not restricted to only the use of the ME speed, as one or more other parameters that are indicative of the signal quality that is experienced by the ME 10 could be employed as well. By example, the overall signal quality experienced by the ME 10 can be influenced by, in addition to the speed of the ME 10, path loss, multipath spread, signal distortion due to transmitter and receiver impairments, and/or interference.

The use of the ME speed is presently preferred, as it can be readily determined or calculated, and correlates well with changes in signal quality that are experienced by the ME 10. The use of the ME speed should not, however be construed as a limitation upon the practice of this invention in deriving the filtering parameter of interest for use by the ME in establishing a filter length for filtering a sequence of measurement data before reporting the measurement data on the uplink to the wireless network.

Figure 1:
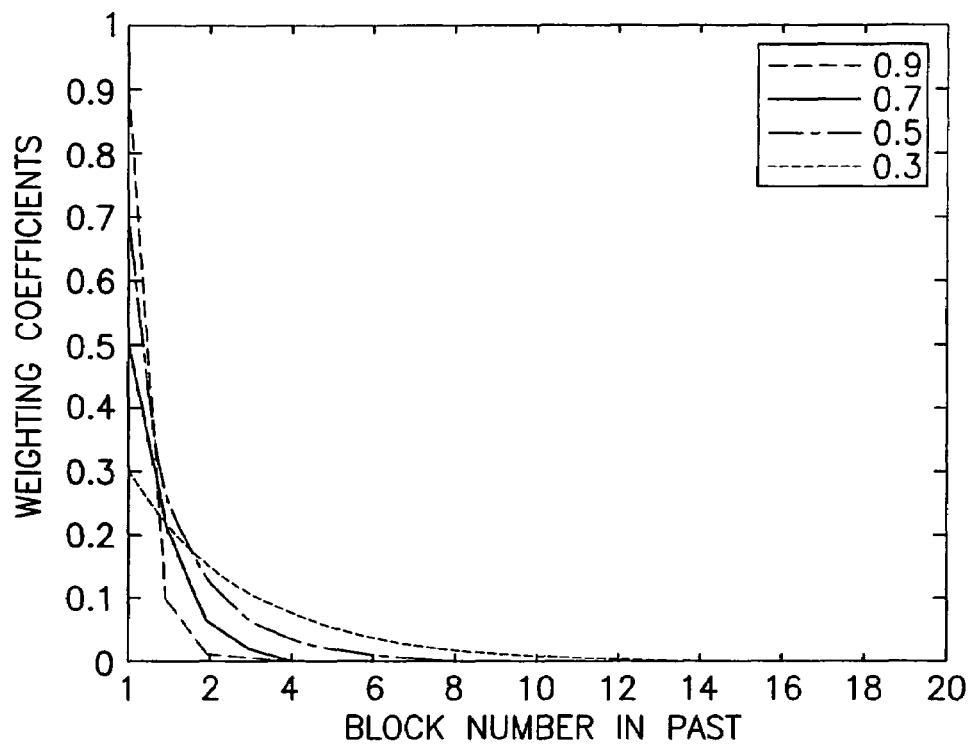
FIGS. 1 and 2 are graphs depicting weighting coefficients using various forgetting factors.
Figure 2:
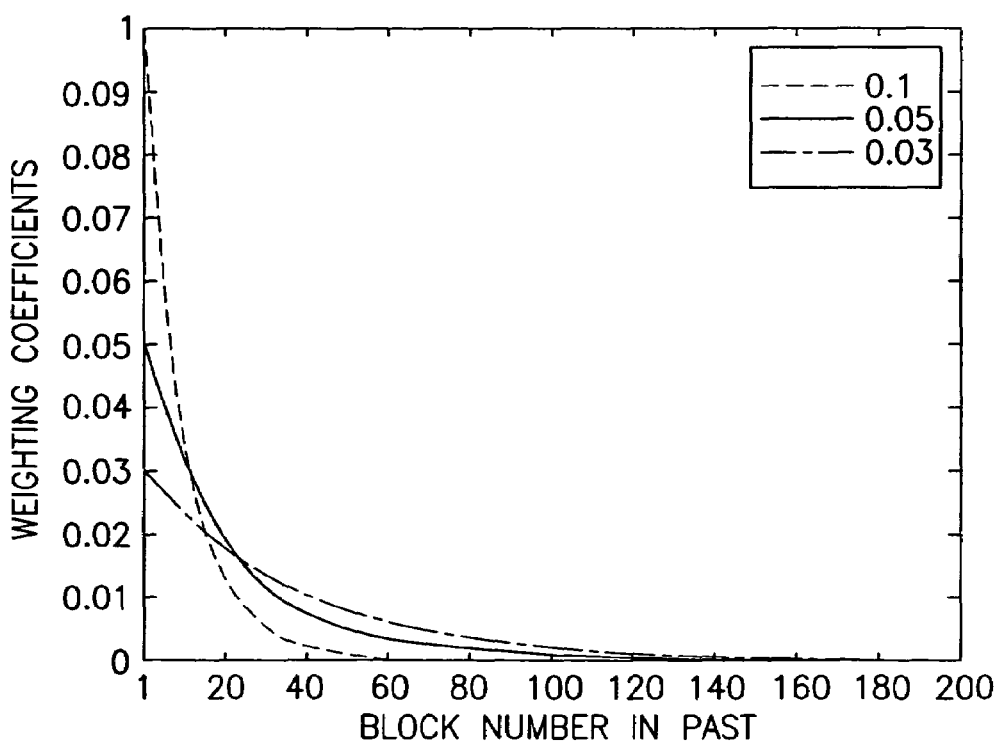
Figure 3:
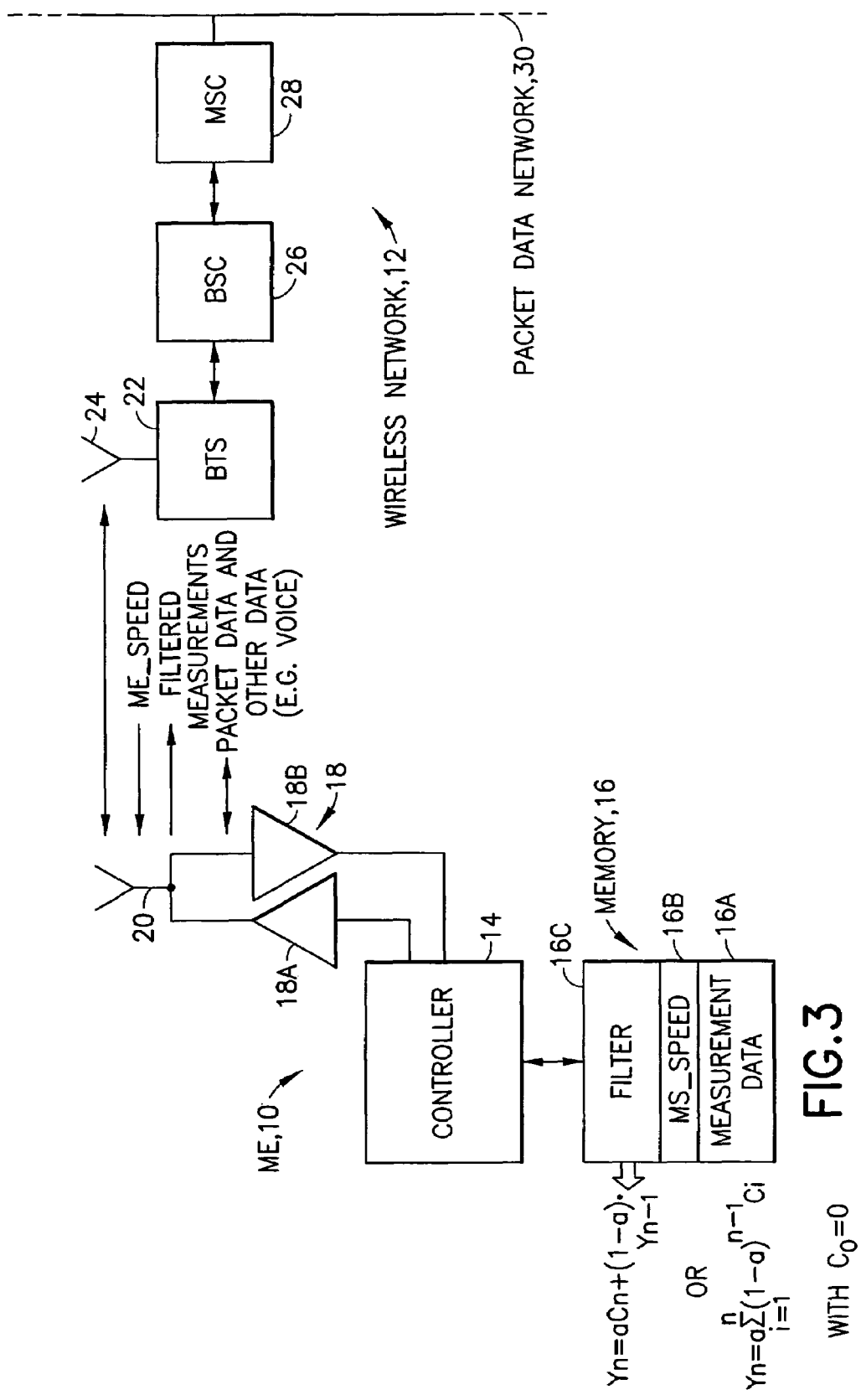
FIG. 3 is block diagram of a mobile equipment located within a cell of a wireless network that is suitable for practicing this invention.

Referring first to FIG. 3, there is shown a simplified block diagram of a mobile equipment (ME) 10 located within a cell of a wireless network 12. The ME 10 and the wireless network 12 are suitable, but not limiting, embodiments for practicing this invention. The ME 10 includes a controller 14, such as a combination of a microprocessor and a digital signal processor (DSP), that is used for controlling the overall operation of the ME 10 and for processing signals before transmission and subsequent to reception. For the purposes of this invention it is assumed the controller 14 is suitably programmed for obtaining the required measurement data, and for executing the measurement data filtering operations as described in further detail below. A memory 16 is bidirectionally coupled to the controller 14, and stores, among other things, past measurement results or data 16A, as well as, in the preferred embodiment, a MS speed parameter (ME_SPEED) 16B that is received from the wireless network 12, in accordance with an aspect of this invention. The filtered measurement data is reported to the wireless network 12 through a transmitter 18A and antenna 20 of a wireless transceiver 18, and the ME_SPEED parameter is received through the antenna 20 and a receiver 18B of the transceiver 18. Packet data and other data, such as voice data (if the ME 10 includes voice capability) and signalling data also passes through the transceiver 18.

The wireless network 12 includes at least one base transceiver station (BTS) 22 having an antenna 24. The antenna 24 may define the center of a serving cell within which the ME 10 is assumed to be located, although directional BTS antennas may be employed as well. In a GSM system the serving cell may have a radius of up to, for example, 35 km. Coupled to the BTS 22 is a base station controller (BSC) 26, which in turn is coupled to a mobile switching center (MSC) 28 or some other suitable interface to landline trunks; such as the public switched telephone network (PSTN) and/or one or more packet data networks 30. The packet data network 30 can include the internet, and may operate with TCP/IP protocols. Other types of packet data networks, such as intranets, can also be provided.

For the purposes of this invention it is assumed that some component of the wireless network 12, such as a data processor of the BSC 26, is capable of estimating the speed of the ME 10, and for reporting the estimated speed using the ME_SPEED parameter. The ME speed can be estimated using any suitable technique or combination of techniques, such as by determining the Doppler frequency shift of the RF carrier signal transmitted by the ME 10, and then correlating the Doppler frequency shift with the speed of the ME 10. It is also within the scope of this invention for the ME 10 to determine its own speed, although this will require additional ME processing.

It should be noted that an indication of the speed of the ME 10 can be used as well for purposes other than filtering such as, for example, for network-based cell reselection. In this case the network will know the speed of the ME 10. As such, while the ME 10 may be capable of determining its own speed, and using the self-determined speed indication for processing the filtering-related information as described herein, it is preferred that the wireless network 12 determine the ME speed, and thereafter inform the ME 10 of the determined ME speed. This also has the advantage that the network 12 has knowledge of exactly how the measurements are processed.

The memory 16 also stores data representing the filter 16C used by the ME 10 when filtering the measurement data. A generic running average filter that is proposed to be used can be expressed as:

$$Y_n = aC_n + (1-a)Y_{n-1},$$

with $C_0 = 0$, or as $$Y_n = a\sum_{i=1}^{n}(1-a)^{n-1}C_i$$

with $C_0 = 0$, where $C_n$ is the measurement data at time instant n in the ME 10 (i.e., mean(BEP) or cv(BEP)); $Y_n$ indicates the filtered measurement data (actually the weighted sum of the past measurement data), and "a" is the forgetting factor. As was noted above, for a large value of "a" the report of filtered measurement data $Y_n$ is dominated by the last few measurement data, whereas for a small value of "a" $Y_n$ is instead related to a larger number of past measurement data. It can be noted that the filter 16C functions as a weighted average of the measurement data. It should further be noted that $a \in [0;1]$.

Figure 4:
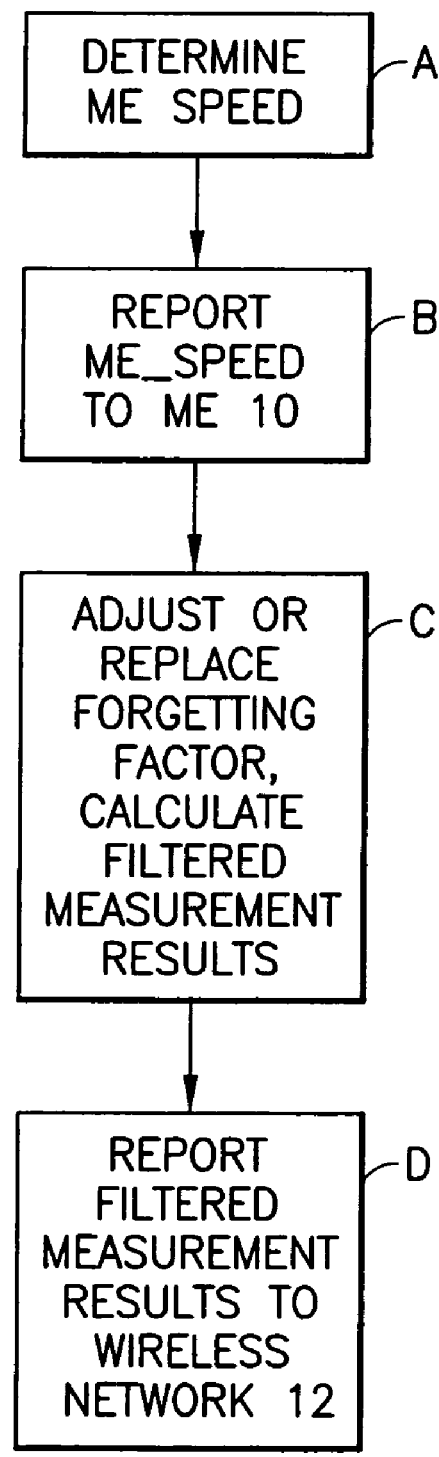
FIG. 4 is a logic flow diagram that illustrates a method in accordance with the teachings of this invention.

In accordance with a method of this invention, and referring also to FIG. 4, at Step A there is determined, such as by the BSC 26, a value of a parameter that indicative of the overall signal quality experienced by the ME 10. As was stated earlier, the overall signal quality experienced by the ME 10 can be affected by, for example, path loss, multipath spread, the speed of the ME 10, signal distortion due to transmitter and receiver impairments, and/or interference. In a preferred embodiment this parameter is the speed of the ME 10, however the use of the speed is not a limitation on the practice of this invention. At Step B the ME speed, or derivative of the ME speed, is reported to the ME 10 using, preferably, a point-to-point signalling message, as opposed to a broadcast-type signalling message (e.g., one sent on the PBCCH). One suitable message type is the Packet Associated Control Channel (PACCH), which is addressed to a specific ME 10 in the packet transfer mode. The speed is reported to the ME 10 using the ME_SPEED parameter.

Preferably, in order to achieve backwards compatibility with existing populations of ME 10 that may not use the ME_SPEED parameter, the ME_SPEED parameter can be inserted in a Packet System Information 13 (PSI13) information element sent on the PACCH, wherein different parameters, e.g., used for measurements in the GPRS, are also sent. The current structure of the PSI13 can be found in GSM 4.60. Defined therein are information elements for describing, when the PBCCH is present in the cell, two elements as follows:

<PSI1_REPEAT_PERIOD:bit (4)>
<PBCCH Description:<PBCCH Description Structure>>

These elements are followed by <padding bits>. It is preferred to place the ME_SPEED parameter in the <padding bits> to achieve backwards compatibility, as an ME 10 that does not use the ME_SPEED parameter will ignore the padding bits (they may be set to all zeroes), whereas a ME_SPEED-enabled ME will be programmed to parse these padding bits to locate the expected ME_SPEED parameter. It is presently preferred to use four bits to represent the ME_SPEED parameter, enabling 16 different values of ME_SPEED to be transmitted. More or less than four bits can be used, depending on the desired resolution of the ME speed as well as on the accuracy of the determination of the ME_SPEED parameter. A presently preferred, but not limiting, speed range is from 0 km/hr to 250 km/hr. The use of the four bits thus divides this speed range into 16 sub-ranges. The wireless network 12 can send ME_SPEED updates as required by simply scheduling a new message to be sent on the PACCH.

At Step C of FIG. 4, upon reception of a ME_SPEED parameter, the ME controller 14 can adjust the value of the forgetting parameter value "a". For example, a default value of "a" that was calculated in the ME 10 based on the parameter that was received in a broadcast message can be refined such as by weighting or adjusting the default value of "a" upwards or downwards as a function of the value of ME_SPEED. In general, a larger value of "a" causes $Y_n$ to be dominated by the last few measurement data at higher speeds (a reduced filter length), whereas a smaller value of "a" causes $Y_n$ instead to reflect a larger number of past measurement data at lower speeds (an increased filter length). Alternatively, the value of "a" can be computed as a function of ME_SPEED, and the default value of the parameter used to calculate "a", received in the broadcast message, can be ignored. When a new value of ME_SPEED is received (i.e., one that differs from a last received value of ME_SPEED), the ME 10 can adjust a previously calculated value of $Y_n$ with the revised forgetting factor "a", or the previously calculated value can be ignored and $Y_n$ recalculated using the revised forgetting factor "a". The ME 10 then calculates the filtered measurement results using, for example, the expression given above, in conjunction with the modified or replaced forgetting factor "a".

At Step D the ME 10 reports the calculated (more accurate) value of $Y_n$ to the wireless network 12 for use in the packet data routines executed by the wireless network.

It should be noted that this procedure is optional and is complementary to the broadcast approaches wherein the parameter value to be used in calculating the forgetting factor "a" is transmitted to all of the ME 10 in the serving cell. That is, no requirement need be imposed on wireless networks that they determine the value of ME_SPEED for different MEs and then transmit the value to the specific ones of the MEs.

In fact, the teachings of this invention can be used in one of at least two different ways. First, the received value of ME_SPEED can be used by the ME 10 to correct or refine the value of "a" that is calculated using the broadcast, generic parameter. Alternatively, the broadcast parameter used to calculate the value of "a" can simply be discarded, and the value of ME_SPEED used in computing a current value of the forgetting factor "a".

It should be noted that the signalling described in the context of this invention can be implemented in a GPRS system, as well as in a EGPRS system, in exactly the same way.

It should again be noted that other uses for the ME_SPEED parameter may exist in the ME 10, such as for power control and handover purposes. Furthermore, the ME-based optimized filtering method for link quality (LQ) channel measurements mad possible by the teachings of this invention can be used for several purposes in real-time EGPRS, such as for mapping some given quality of service (QoS) to some modulation or coding scheme (e.g., for speech, streaming video, etc.)

While described above in the context of specific numbers of bits, specific speed ranges, specific message formats and the like, it should be realized that these are exemplary of presently preferred embodiments of this invention, and are not intended to be read or construed in a limiting sense upon the practice of this invention. In general, the teachings of this invention can be applied to revising or refining any ME-based determination of link quality (not necessarily one using mean (BEP) or cv(BEP)) by a consideration of the speed of the ME 10 within the serving cell, and/or by the consideration of some other ME signal quality influencing factor.

Thus, while the invention has been particularly shown and described with respect to preferred embodiments thereof, it will be understood by those skilled in the art that changes in form and details may be made therein without departing from the scope and spirit of the invention.

What is claimed is:

1. A method comprising:
   receiving an indication of signal quality experienced by a particular mobile equipment;
   setting a finite length of a filter as a function of the received indication of signal quality;
   filtering a sequence of link quality measurement data using the finite length filter; and
   transmitting from the particular mobile equipment an indication of the filtered link quality measurement data.

2. The method of claim 1, wherein the indication of signal quality comprises an indication of the particular mobile equipment's speed.

3. The method of claim 1, wherein the indication of a signal quality is received in a point-to-point message.

4. The method of claim 1, wherein setting the finite length of the filter comprises setting a forgetting factor.

5. The method of claim 4, further comprising:
   calculating a default forgetting factor based on a parameter received in a broadcast message;
   and wherein setting the finite length of the filter comprises modifying the default forgetting factor.

6. The method of claim 1, wherein the sequence of link quality measurement data comprises bit error probability.

7. The method of claim 1, wherein the indication of the filtered link quality measurement data comprises mean bit error probability.

8. The method of claim 1, wherein the indication of the filtered link quality measurement data comprises coefficient of variation of bit error probability.

9. The method of claim 1, executed by the particular mobile equipment.

10. The method of claim 9, wherein the filter is disposed in the particular mobile equipment.

11. The method of claim 10, further comprising calculating in the particular mobile equipment a default factor;
    and wherein setting the finite length of the filter comprises modifying the default factor.

12. The method of claim 11, wherein the default factor comprises a default forgetting factor that is calculated based on a parameter received from a network.

13. The method of claim 12, wherein the parameter is received from the network in a broadcast message.

14. An apparatus comprising:
    a receiver configured to receive an indication of signal quality experienced by a particular mobile equipment;
    a processor configured to implement a filter for filtering a sequence of link quality measurement data, said filter having a finite filter length that is a function of the received indication of signal quality; and
    a transmitter, coupled to the processor, configured to transmit an indication of the filtered link quality measurement data.

15. The apparatus of claim 14, wherein the apparatus comprises the particular mobile equipment and the indication of signal quality comprises an indication of the particular mobile equipment's speed.

16. The apparatus of claim 14, wherein the indication of a signal quality is received in a point-to-point message.

17. The apparatus of claim 14, wherein the finite length comprises a forgetting factor.

18. The apparatus of claim 17, wherein:
    the receiver is further configured to receive from the network a broadcast message that includes a parameter;
    and the processor is further configured to calculate a default forgetting factor based on the parameter received in the broadcast message;
    and wherein the processor is configured to implement the filter by modifying the default forgetting factor.

19. The apparatus of claim 14, wherein the sequence of link quality measurement data comprises bit error probability.

20. The apparatus of claim 14, wherein the indication of the filtered link quality measurement data comprises mean bit error probability.

21. The apparatus of claim 14, wherein the indication of the filtered link quality measurement data comprises coefficient of variation of bit error probability.

22. The apparatus of claim 14, wherein the apparatus comprises the particular mobile equipment.

23. The apparatus of claim 22, wherein the filter is disposed in the particular mobile equipment.

24. The apparatus of claim 23, wherein the processor is configured to calculate a default factor, and is configured to implement the filter by modifying the default factor.

25. The apparatus of claim 24, wherein the default factor comprises a default forgetting factor and the processor is configured to calculate the default forgetting factor based on a parameter received from a network.

26. The apparatus of claim 25, wherein the parameter is received from the network in a broadcast message.

27. An apparatus comprising:
 receiving means for receiving an indication of signal quality experienced by a particular mobile equipment;
 processing means for implementing a filter for filtering a sequence of link quality measurement data, said filter having a finite filter length that is a function of said received indication of signal quality; and
 transmit means for transmitting an indication of the filtered link quality measurement data.

28. The apparatus of claim 27 wherein the finite length of the filter is a function of a forgetting factor that is influenced by the received indication of signal quality.

* * * * *